United States Patent [19]

Lindberg

[11] Patent Number: 4,696,279

[45] Date of Patent: Sep. 29, 1987

[54] COMBUSTION CONTROL SYSTEM

[75] Inventor: John E. Lindberg, Point Richmond, Calif.

[73] Assignee: Combustion Control Developments, Ltd., Richmond, Calif.

[21] Appl. No.: 771,290

[22] Filed: Aug. 30, 1985

[51] Int. Cl.[4] ............................................. F02M 25/06
[52] U.S. Cl. .................................. 123/570; 123/25 E
[58] Field of Search .................. 123/25 R, 25 A, 25 B, 123/25 D, 25 E, 25 L, 25 P, 568, 570

[56] References Cited

U.S. PATENT DOCUMENTS

| | | | |
|---|---|---|---|
| 2,087,411 | 7/1937 | Lundquist | 123/570 |
| 3,817,221 | 6/1974 | Nohira et al. | 123/25 R |
| 3,983,882 | 10/1976 | Billings | 123/25 A X |
| 4,183,338 | 1/1980 | Lindberg | 123/25 E |
| 4,270,508 | 6/1981 | Lindberg | 123/568 |
| 4,279,223 | 7/1981 | Csonka et al. | 123/25 R X |
| 4,323,045 | 4/1982 | Yamashita | 123/570 |
| 4,503,813 | 3/1985 | Lindberg | 123/25 E |

Primary Examiner—Willis R. Wolfe, Jr.
Attorney, Agent, or Firm—Owen, Wickersham & Erickson

[57] ABSTRACT

A combustion control system for an automotive engine in a vehicle. A sidestream exhaust gas tube has a scoop inlet in the engine's exhaust-gas conduit. A first metallic tube portion leads from the scoop to a point forward of the vehicle's radiator, so that it directly receives ambient air on its exterior surface, thereby cooling the exhaust gas to near ambient-temperature. A water trap then removes condensed water from the sidestream exhaust gas, along with entrained particles. A final insulating tube portion extends rearwardly of the radiator and helps to limit reheating of the cooled exhaust gas while conducting it to a reactor device. There, an inlet for the exhaust gas receives the cooled exhaust gas and conducts it to first ejector for drawing in aqueous liquid and to a second ejector for drawing in atmospheric air and mixing it with the gas-liquid mixture from the first ejector. The reactor's outlet is connected to an axial inlet of a device having a vortex chamber with a tangential inlet connected to a gas supply at substantially atmospheric pressure. An axial outlet from the vortex chamber is connected directly to a gas inlet opening of the engine, leading to the intake manifold, which is free from obstructions and leads in one chamber to the intake valves of all cylinders or combustion chambers.

30 Claims, 23 Drawing Figures

FIG. 2-A

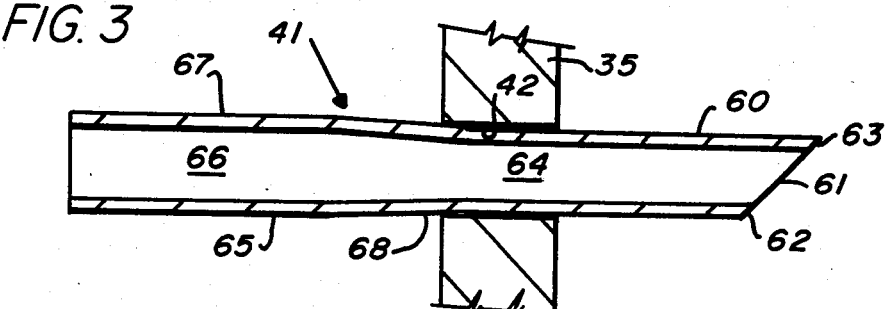
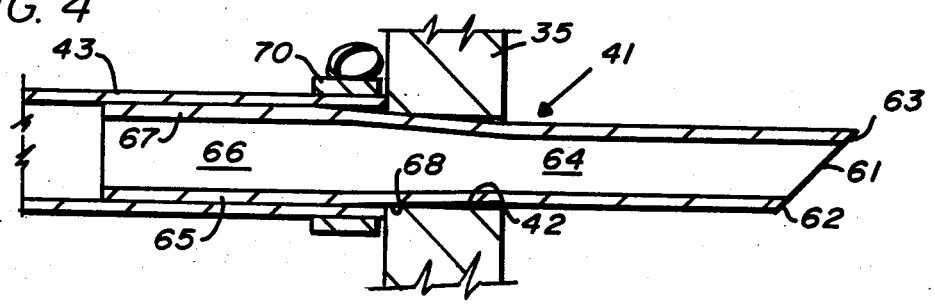
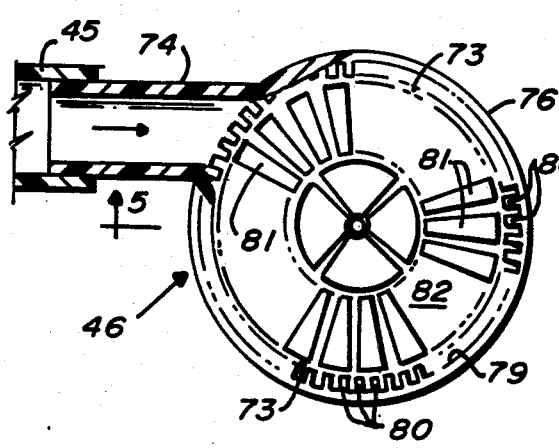
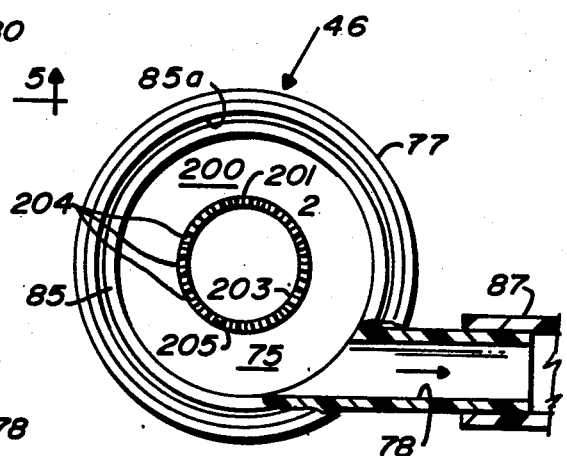
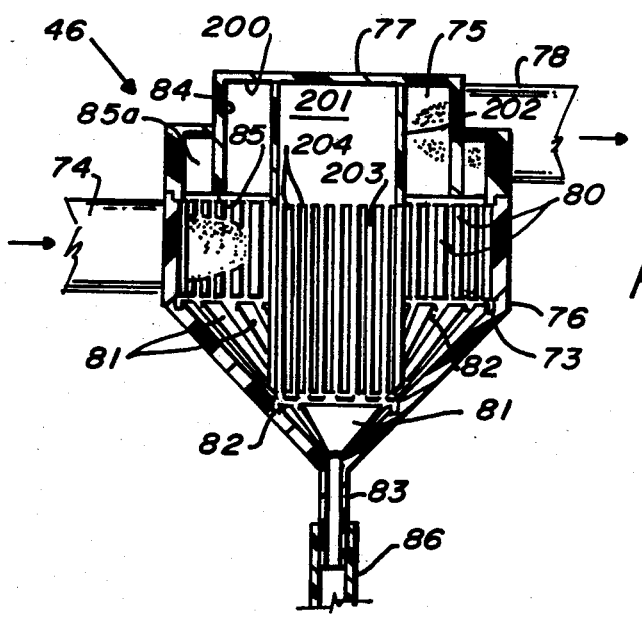

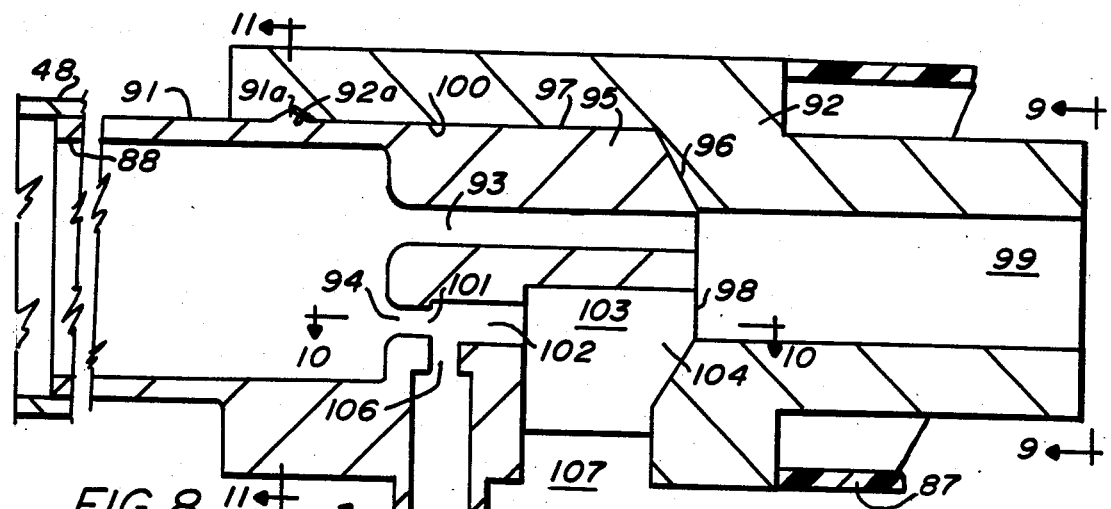
FIG. 8
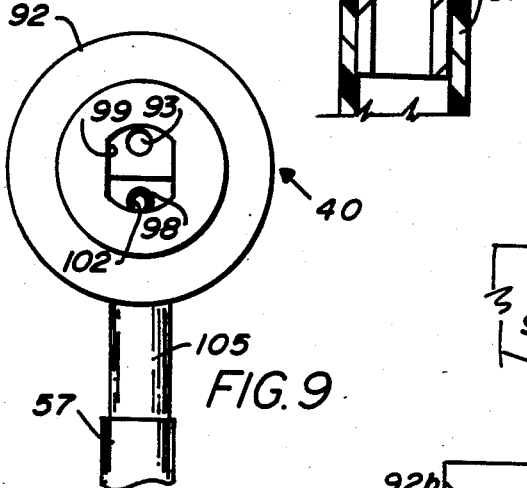
FIG. 9
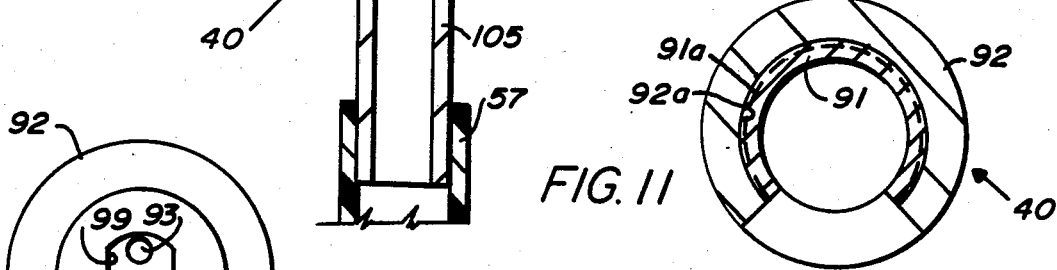
FIG. 11
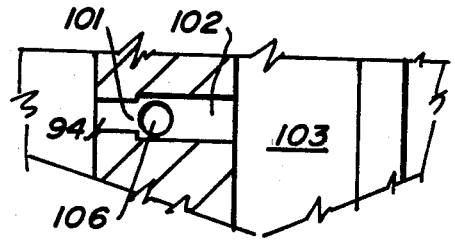
FIG. 10
FIG. 8-A
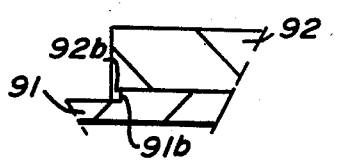
FIG. 12
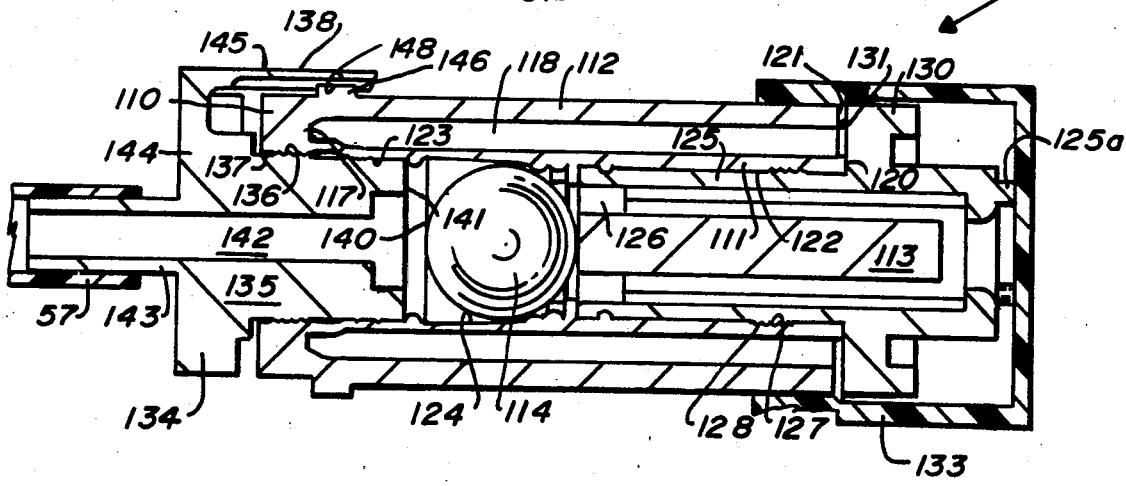

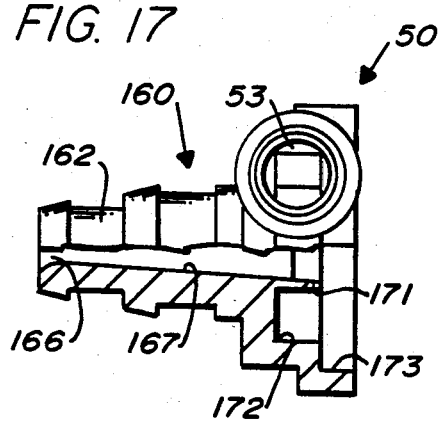
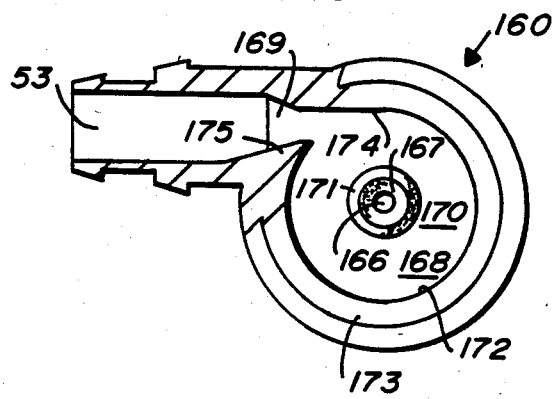
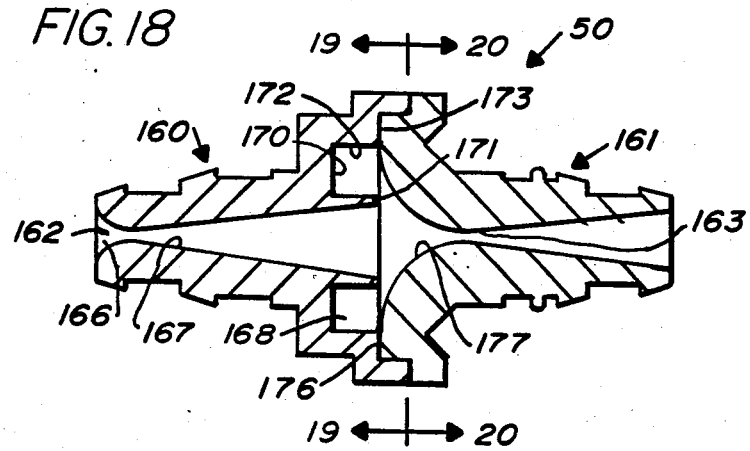
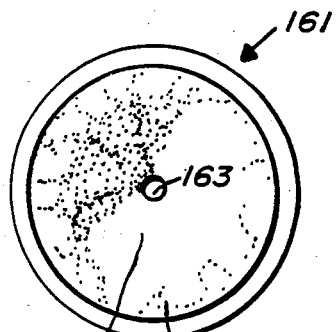
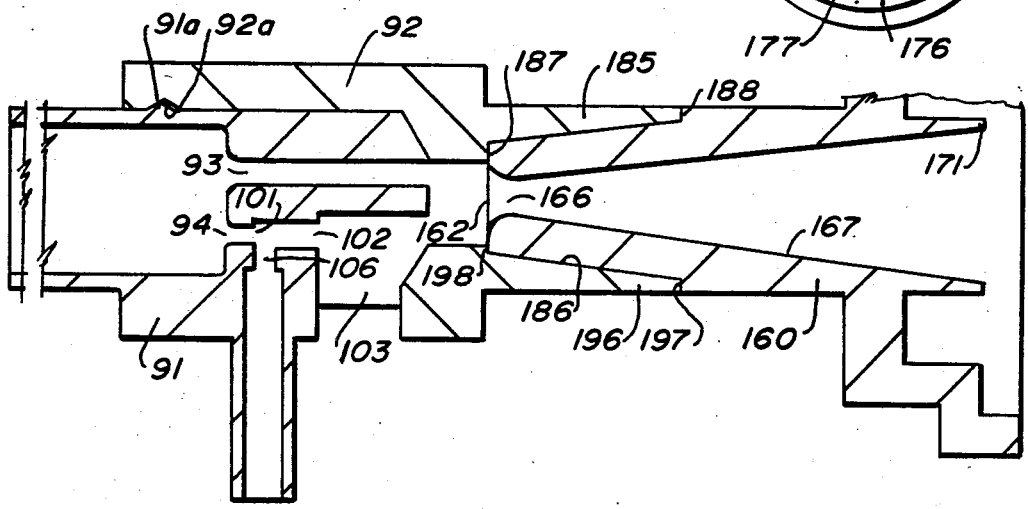

COMBUSTION CONTROL SYSTEM

This invention relates to an improved combustion control system, and to elements thereof.

BACKGROUND OF THE INVENTION

The present invention may be considered as an improvement to my earlier combustion control systems, especially those shown in U.S. Pat. Nos. 4,270,508 and 4,417,548. Also, the present system includes improvements in the control valve shown in U.S. Pat. No. 4,465,095.

In my earlier patents, U.S. Pat. Nos. 4,270,508 and 4,417,548, successful attempts were made to obtain in a branch conduit both the full total pressure and the full heat of the exhaust gas from the exhaust system of the internal combustion engine. At that time it was believed that the heat of the hot exhaust gas was needed in order to vaporize the water and the fuel and to prevent solid particles and water from dropping out or condensing out from the gases and depositing so as to plug the reactor orifices. However, I have now discovered that, while the exhaust gas total *pressure* is needed, the exhaust gas *heat* failed to accomplish its objective, and solid particles did deposit and tend to cause plugging of the reactor orifices. Consequently, this new system has been devised which cools the gas sidestream extracted from the exhaust system,—a completely different approach which, as will be seen, solves the problem and does so in a distinctly different manner that contrasts very sharply with the system shown in my earlier patents. In this new system the water and fuel are fully vaporized without exhaust heat. In order for this different approach to work, this sidestream must be cooled and freed substantially from water and solid particles, and the present invention accomplishes this.

In obtaining the full total pressure of the exhaust system, an accomplishment which is still highly desirable, I employed, in FIG. 3 of U.S. Pat. No. 4,270,508, a scoop member. This scoop member had an exteriorly threaded portion which was installed into the exhaust system by providing the exhaust housing with a threaded tapped opening into which an exteriorly threaded portion of the scoop and gas conducting member was threaded. Moreover, in order to maximize the supply of heat to the reactor elements, the scoop had been made as part of the reactor. Moreover, in order to withstand the exhaust heat, the reactor had been made of sintered stainless steel, and the product was consequently weak to torque; in fact the reactor tended to break if much torque were applied during installation. Since then, I have found that although this threaded installation can work well for professionals who are scrupulous about following directions, it does not work well for do-it-yourselfers, or for those who either do not read or do not follow the directions. Thus, the installation was not foolproof. It is important for the scoope to be correctly aligned with and face squarely into the exhaust flow; this can be done if the threading of both members is accurate and if the person following the directions inserts the scoop member in a way to achieve only finger-tightness; that is, he should sense with his fingers while the system is being installed and can feel and see when it is tight and correctly aligned. However, inexperienced people are apparently unable to do this; therefore, in the present invention I provide a novel system for accomplishing correct alignment in a substantially foolproof installation procedure. The new installation system become more practical when the heat was not required by the reactor, so that the reactor could be distant from the scoop.

At a time when it was believed that the full heat, as well as the full pressure of the exhaust gas, was needed at the reactor, the reactor was placed as close as possible to the exhaust member, and this meant that it was rather distant from the vortex device. I have now found that surprisingly better results can be obtained by placing the reactor quite distant from the exhaust pickup scoop, and placing it closely adjacent to the vortex member. In connection with this new placement, some problems arose in the removal of water and solid particles and also in other matters, all of which are discussed in a following section. These relate to the provision of cooling means and related elements.

In the reactor, where ejectors are employed to pull in air and water, it has been found that earlier beliefs concerning the number and size of the orifices did not result in achievement of the results expected, except on accurate bench or laboratory tests. The good results of these tests did not carry over to the commercially produced articles, at least not when special care could not be taken at all parts of the system. I have therefore made some significant changes in the reactor as to the number and size of its orifices. Moreover, since the fluids applied to the reactor are, in this invention, cool, the reactor may be made from less expensive materials. It may even be made from molded plastic parts.

The source of water for use in the ejector can be as heretofore, but there are advantages in using a self-supplying system that does not require periodic bulk refilling of the water reservoir. For example, the water content of the exhaust gas can be availed of and used to feed the reservoir. This is another problem requiring a practical solution.

The feed of water to the reactor, was improved between U.S. Pat. Nos. 4,270,508 and 4,417,548 by incorporating the control valve of U.S. Pat. No. 4,465,095. However, in that structure some difficulty was experienced in obtaining and retaining the proper position of the ball member relative to the magnet and to the orifice. In particular, the ball tended to stick in its housing. I have now modified the structure of that control valve in order to provide improved accuracy in positioning the ball, to prevent such sticking, and to enable a simple and accurate adjustment to be made without nullifying the good results of the apparatus.

U.S. Pat. No. 4,417,548 showed an improved form of the vortex member. However, I have found that significantly better results can be obtained by a change in the venturi leading from the reactor into the vortex chamber. This venturi lies axially of the vortex chamber, and I have found that by going to a particular size of orifice and a particular angle of flare from the orifice to the chamber, superior results can be achieved. Moreover, by extending the passageay a short distance beyond the initial wall of the vortex, further improved results can be obtained.

As a result of the research done in the course developing the present invention, I have also found that better combustion can be obtained by removing the ducts and barriers from the intake manifold.

OBJECTS OF THE INVENTION

An important object of the invention is to provide a new cylinder charge forming means, using a "tornado"

to shear between fluid layers and lower the pressure of any liquids to be uesd in the charge formation, to vaporize the liquids and use the "tornado" as a conduit to carry the charge successively to each cylinder as its intake valve opens, via a wide open intake manifold free from ducts and barriers.

A further object is to provide charge swirl in the combustion chamber for better combustion and lowered octane requirement.

Another object of the invention is to cool the charge and thereby lower the octaine required to increase the power.

Another object is to provide microscopic water droplets at full throttle, which in the cylinder flash into vapor and thereby cool the charge, letting in more charge before the intake valve closes. This is a form of supercharging.

Another important object of the invention is to provide a vortex structure that results in a cool tornado-like vaporizing system using shear between accelerating fluid layers and also using decreasing pressure as the fluids move inwardly, from the outside to the center of the "tornado" to achieve the vaporization of fluids passing through this system, including the water and any fuel—whether hydrocarbons, alcohols, cooled liquid hydrocarbons—and liquid oxidizers when used, such as liquid air, liquid oxygen, nitrous and nitric acid, etc.

Another object of the invention is to provide significant improvements to the combustion control system of U.S. Pat. No. 4,417,548.

Among particular objects are the following: to assure accuracy in the placement of the exhaust-gas scoop and to simplify and make more reliable the installation procedure for the scoop, by using new structure.

Another object is to reduce or eliminate the drop-out of solid particles and liquid drops at the reactor and vortex and thereby prevent the formation of solid deposits and the plugging of the orifices of the reactor and vortex member.

It is also an object to provide a cooling system for cooling the taken-off stream of exhaust gas which is sent to the reactor, while retaining the full pressure therein.

A further object is to improve a system for recovering water from the exhaust gas to supply the water used for combustion of fuel in the engine; an additional object is to improve the flow control valve of U.S. Pat. No. 4,465,095 so as to improve its accuracy in adjustment and function.

A further object is to improve the inlet for exhaust gas, air, and water leading into the vortex device.

Another object of the invention is to provide for the removal of water vapor from the exhaust charge, so that the initial charge is richer in oxygen, as a result of removal of the partial pressure of water vapor previously introduced with the exhaust gas. Further, the cooling-induced supercharging, which is caused by evaporation of the microscopically small water droplets at full throttle, becomes greater as the charge starts to dry.

A further object of the invention is to provide a new type of polyether urethane foam filter to prevent filter blockage, which had occurred in fine-mesh mechanical filter, due to algae gel formation.

Other objects and advantages of the invention will appear from the following description of some preferred forms thereof.

SUMMARY OF THE INVENTION

The combustion control system of the invention applies to an automotive engine in a vehicle having a plurality of cylinders with intake valves and exhaust valves leading to an exhaust conduit. It provides a wide-open intake manifold with no ducts or barriers, so that all of the cylinders are joined in the larger open intake manifold. Fuel-feeding, whether by carburetor or injection, supplies fuel to this intake manifold. In conjunction with this is a system for providing to the intake manifold a whirling, tornado-like stream of gas acting to shear any liquids in the manifold and to provide a low-pressure vortex center to create a vapor-laden whirling charge to each cylinder when its intake valve is open. Preferably, the system produces a mixture of gas and liquid vapor before the stream enters the intake manifold and therein entrains the fuel.

The combustion control system of the present invention, like that of U.S. Pat. No. 4,417,548, includes (1) taking a sidestream of the exhaust gas at the total pressure (i.e., velocity head, plus static head) within the exhaust gas conduit, (2) using that sidestream and its pressure, converted to high velocity and low pressure at reactor orifices, to draw water and air into the reactor, and (3) sending the mixture to a vortex member, into which atmospheric air or PCV gas, flows via a tangential inlet. From the vortex, the resultant mixture is sent to the engine induction system, preferably at a point directly in line with the fuel flow and, in a carburetor system, located below the butterfly valve. The PCV gas inlet opening of the intake manifold is located at a satisfactory point in many engines and may be utilized for this purpose.

The reactor has, however, been relocated in this new system so that the total exhaust gas pressure is retained while the temperature thereof is greatly reduced, preferably to around 100° F. The sidestream of the exhaust gas is first taken from the mainstream of exhaust gas, by a novel scoop which is installed by a tapered stem fitting into a drilled cylindrical opening through the exhaust housing. The taper fit enables anyone to obtain full accuracy upon installation without requiring skill or special tools.

The gas taken in by the improved scoop passes directly into a heat-conductive tubing, preferably of metal such as aluminum, which extends for several feet, e.g., four or five feet. This tubing normally goes forward of and outside the engine compartment and forward of the radiator, so that it is exposed to the much cooler air at ambient temperature.

Once this sidestream of exhaust gas has been cooled, water begins to condense out of it, and this water is removed, taking with it the solid particles which are contained in the exhaust gas because today's gasoline contains unburnable additives. The sidestream is then kept at or close to that cooler temperature, even when it goes back from in front of the radiator, into the engine compartment where it is subjected to engine heat. This may be done by using a good insulating tubing, such as a rubber hose, which is connected at one end to the aluminum or other metal conduit, and is connected at its other end to a centrifuge and then from there to the reactor. The total path of metal and rubber hose may be six to eight feet, with about four or five feet in metal tubing and the remainder in rubber hose. This structure achieves the important maintenance of the exhaust gas *pressure,* while, at the same time, substantially reducing the temperature of this gas sidestream. The use of these hoses therefore, overcomes the disadvantages that were caused by high temperatures, at which the gas tended to carry along matter that would eventually drop out at the wrong place, namely, at the orifices, and plug those orifices. In the present invention the particles are removed along with condensed water shortly after the passage of the exhaust gas sidestream into the rubber hose.

The use of this novel conduit system makes it possible to place the reactor immediately adjacent to the vortex member. A short conduit may be used to provide that connection, or the reactor and the vortex may be made in a unitary assembly.

The lowering of the temperature at the reactor also means that the reactor can be made of far less expensive materials and can be more accurately duplicated in mass production. Formerly, the reactor was made by sintering powdered metal; this was done by employing the substantial pressure needed to provide a molded unit and then sintering it in a controlled atmosphere to make a unit capable of withstanding the high heat of the exhaust gases. This manufacturing method provided reasonably accurate axial ejector orifices; however the radial orifice for the water had to be drilled after the sintering, so that the diameter and axial position of the drilled orifice varied with machine settings and tool wear. Hence it was difficult to keep the water orifice tangent to its adjacent ejector orifice, and production reactors varied too much in performance. That is no longer necessary; so the reactor may be made of much less expensive cast metal or even of still less expensive and more accurately molded plastic, because the reactor is now subjected only to temperatures well below that which current such plastics can withstand.

I have found that fewer orifices are needed in the reactor than was once thought necessary, and that the size of these is important, being determined such that the new size also acts as a factor in reducing the likelihood of plugging of the orifices.

The water which is drawn by the exhaust gas sidestream into the reactor, may be supplied from a reservoir, which may be refilled from time to time or may more or less continuously be refilled during driving by a novel type of condensation apparatus forming part of this invention, in which the water is obtained by condensing moisture contained in the exhaust gas. This may be done by employing the invention of my U.S. Pat. No. 4,503,813, or it may be done very close to the engine, for it is not necessary to do the condensation at the end of the exhaust gas conduit near the tail pipe outlet, as was formerly believed and as shown in that patent. Some of this water may be supplied by recovery of the water condensed from the exhaust gas sidestream that is sent to the reactor.

The invention also provides novel structure in the flow control valve, which may conduct the water from the water reservoir to the reactor; this new structure includes a novel type of O-ring which a concave annular recess on its outer periphery, and with locating means such that the ball of that member is properly located in a way which eliminates the former tendency to stick.

The vortex device itself has also been improved by providing a venturi in the axial inlet, which is somewhat different in shape from that shown in U.S. Pat. No. 4,417,548, and provides a fourteen-degree included angle from the narrowest point forward. In this novel system, the axial inlet extends into the vortex space well beyond the initial wall thereof. This results in a system which improves the vaporization of liquids, even at cool temperatures which are well below the liquid's normal vaporization temperature; it also improves the mixing of the gases and vapor, for it shears the fluids and lowers the pressure, and both these actions aid in vaporizing any liquids present.

The system of this invention increases horse power substantially. It lowers octaine requirements to a lowre grade of fuel. It increases fuel economy and gives lower emissions. The system takes over control of the combustion process and uses wasted energy, fuel, and P.C.V. products to make the engine energy efficient. It responds to engine demand instantly. It cleans the engine internally of carbon deposits and prolongs spark plug life.

It also helps to stop oil contamination due to raw fuel going by the rings and therefore prolongs engine life.

Other objects and advantageous of the invention will become apparent from the following description of some preferred forms of the invention, which will be described in detail and with reference to the drawings.

BRIEF DESCRIPTION OF THE DRAWINGS

FIG. 2A is a somewhat diagramamtic plan view of the intake manifold and engine cylinder layout.

FIG. 3 is an enlarged fragmentary view in section of a scoop member being installed into an exhaust conduit.

FIG. 4 is a similar view of the completed installation of the scoop member, also showing its connection by a clamp to the metal cooling tube.

FIG. 5 is a view in vertical section of a capillary centrifuge forming part of the present invention and used to remove water and solid particles from the exhaust gas sidestream.

FIG. 6 is a plan view of the lower element of the centrifuge of FIG. 5 with some parts broken away and shown in section.

FIG. 7 is a bottom view of the upper element of the centrifuge of FIG. 5, with some parts broken away and shown in section.

FIG. 8 is a view in side elevation and in section of a reactor device embodying the principles of the invention.

FIG. 8A is a fragmentary view of a modified portion of the device of FIG. 8.

FIG. 9 is a view in section of the reactor taken along the line 9—9 in FIG. 8 and reduced in scale.

FIG. 10 is a view in section taken along the line 10—10 in FIG. 9.

FIG. 11 is a view in section taken along the line 11—11 in FIG. 8 and reduced in scale.

FIG. 12 is a view in section of a control valve provided according to the principles of the present invention.

FIG. 17 is a view in side elevation and partly in section of the entrance half of the vortex assembly.

FIG. 18 is a view in vertical section of an improved vortex device embodying the principles of the present invention.

FIG. 19 is a view in section taken along the line 19—19 in FIG. 18 showings the entrance half of the vortex device.

FIG. 20 is a view of the other half of the vortex device.

FIG. 21 is a view in section of a modified form of reactor-vortex construction.

DESCRIPTION OF SOME PREFERRED EMBODIMENTS

Figure 1:
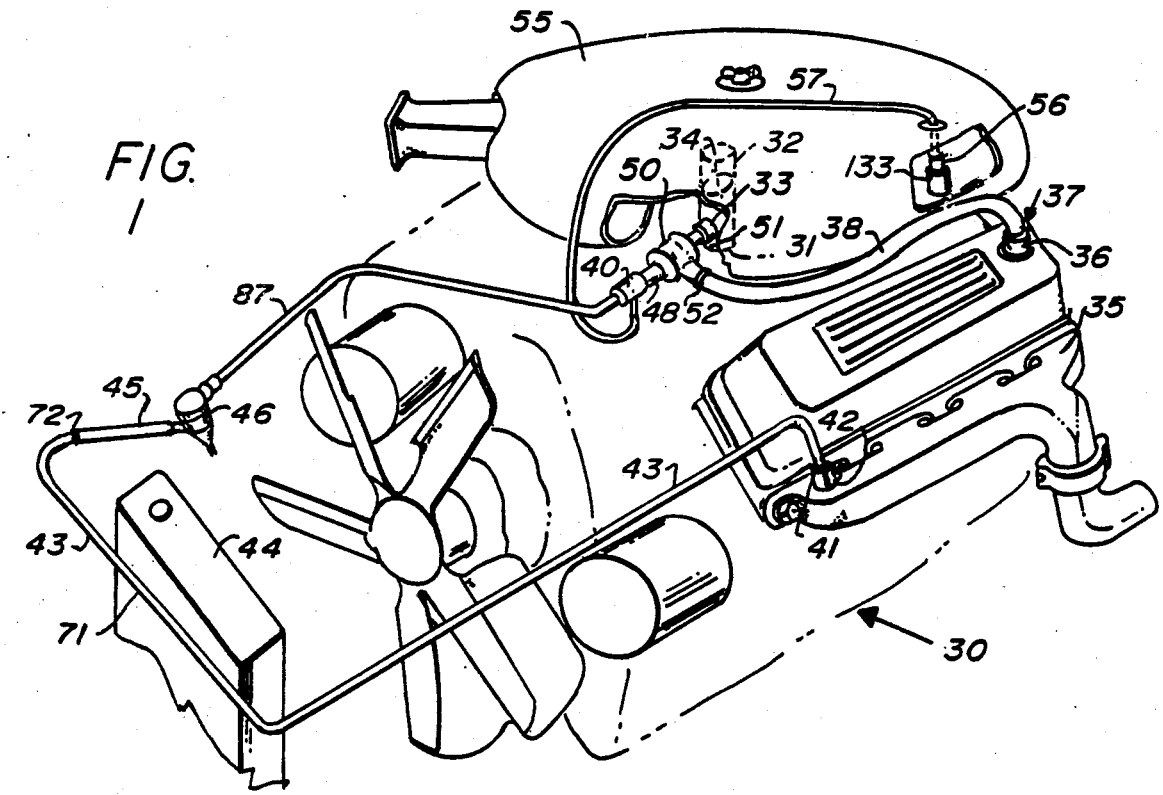
FIG. 1 is a view in perspective of an internal combustion engine in which the combustion control system of the present invention has been installed.
Figure 2:
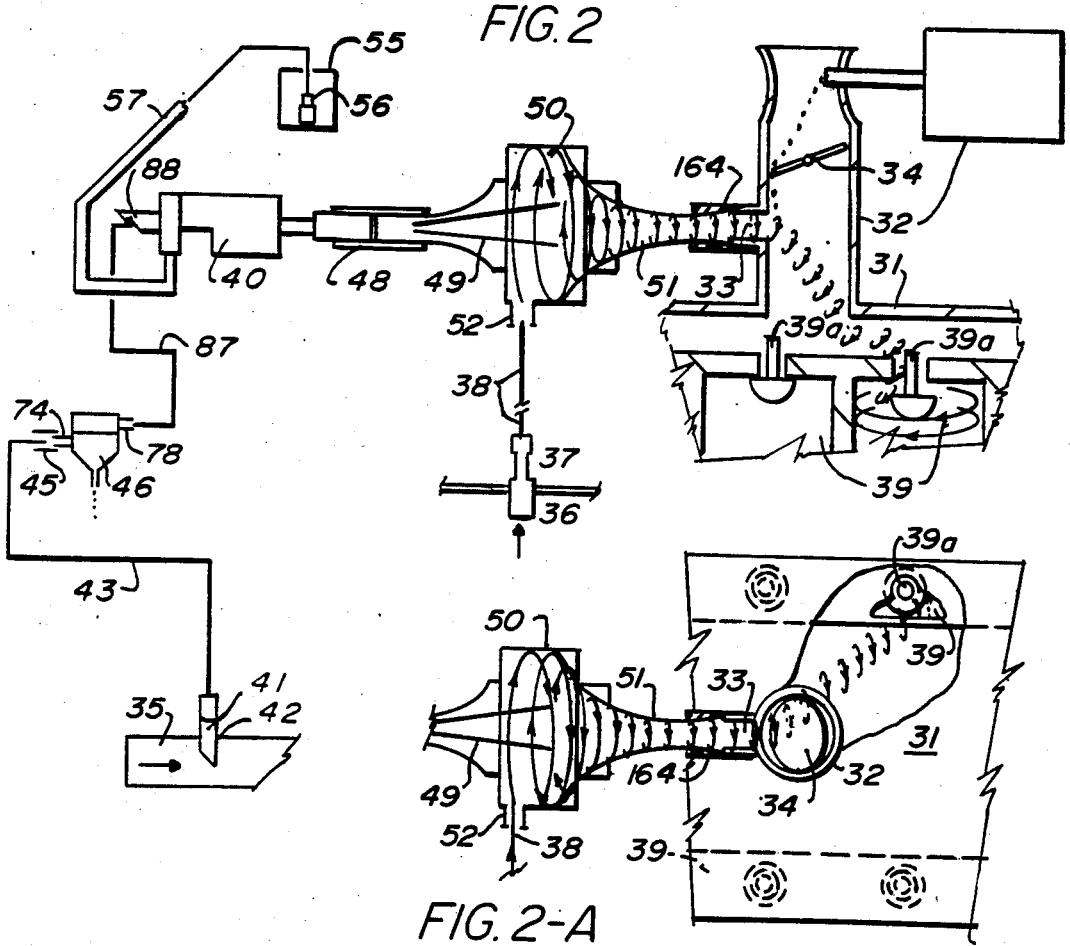
FIG. 2 is a simplified diagrammatical view, with parts broken off or broken away, of the engine of FIG. 1 and the control system therefore.

Overall view of the complete system (FIGS. 1 and 2)

FIGS. 1 and 2 show in simiplified form a system embodying the principles of the invention in connection with an internal combustion engine 30. The engine 30 has an intake manifold 31 with a carburetor 32 and a PCV-gas inlet 33 leading into an intake manifold 31 below a butterfly valve 34 or some similar valve. The intake manifold leads to a plurality of combustion chambers 39, each with its inlet valve 39a. The engine 30 also has an exhaust manifold 35, and an opening 36 into its valve cover. A PCV valve 37 or something in its place is usually mounted in the opening 36 and has a conduit 38 attached to it.

In preferred embodiments of this invention, the intake manifold 31 is wide open, with no ducts or barriers, so that all of the combustion chambers 39 are joined in the same wide-open intake manifold. The flow of fuel and other gases is shown in FIG. 2.

The present invention employs a reactor 40 which, instead of being closely adjacent to the exhaust manifold 35 and directly connected to it, is spaced several feet away from it and connected to it by tubing. Thus the present invention includes a scoop device 91 which is installed into a drilled opening 42 in the exhaust manifold 35, in a manner shown in FIGS. 3 and 4 and which will be explained below. Clamped to the scoop member 41 is an aluminum or other highly conductive metal tubing member 43 which conducts the exhaust gas at the same pressure while cooling it off, doing this by conducting it to a cool area near the engine 30 and preferably in front of a radiator 44 for the engine and going across to the opposite side of the radiator 44. This metal tube 43 may be four or five feet long, more or less, depending on the size and model of the vehicle.

At a point approximately even with the radiator 44, where the exhaust gas with its initial pressure but at a much lower lower temperature is to be returned to the area around the engine 30, a suitable black rubber hose or tube 45 is provided, which is connected directly to the metal tube 43 and conducts the cool exhaust gas to a water removal device 46, preferably a centrifuge, where water is condensed from the exhaust gas sidestream and removed along with solid particles, both of which might otherwise plug the reactor orifices. The dry, clean, exhaust gases are then conducted from the centrifuge by a hose or tube 87, which may be several feet long and leads to the reactor 40. The reactor 40 may be directly connected, or connected by a very short conduit 48, to an axial inlet 49 of a control or vortex device 50 located closely adjacent to the intake manifold 31. The vortex device 50 has its outlet 51 connected to the inlet opening 33 for the intake manifold 31. The PCV valve 37 is connected by conduit 38 to a tangential inlet 52 of the vortex device 50.

The vortex generates a tornado-like stream that shears the fluids and provides low pressure in its center, which together vaporize fuel, PCV products, and water at all conditions except full throttle, when the water is in microscopic liquid droplets. When the tornado-like stream enters the engine, it pulls fuel into it and vaporizes it. This charge of fuel, air, gas, and liquid is carried to each cylinder or combustion chamber 39 at the time its intake valve 39a is open and provides a greatly-to-be-desired gas swirl in the chamber 34.

A water reservoir 55 of some sort is provided. The reservoir 55 may be one that is filled from time to time at the service station, or it may be and preferably is one that is provided with water condensed from the exhaust gases, either by the water trap 46 or by another device. In either event, the reservoir 55 preferably contains, at the rear thereof, a water intake control valve 56, which is generally like that shown in U.S. Pat. No. 4,465,095, but is preferably an improved model described later on. The valve 56 is preferably mounted vertically, and a conduit 57 then connects the upper end of the valve 56 to the rector 40.

The result of this overall system is to improve combustion, beyond what is shown in U.S. Pat. Nos. 4,418,338; 4,270,508; and 4,417,548. It does this in a more efficient manner than heretofore, and with parts that are easier and therefore less expensive to manufacture, and it provides for elimination of some of the problems heretofore encountered with such systems.

The scoop 41 (FIGS. 3 and 4)

The scoop 41 is essentially a short tube, preferably stainless steel, with a smaller diameter portion 60 that extends into the exhaust manifold 35 and has its inlet 61 cut off at approximately 45°, so that there is a short end 62 and a long end 63. The tube inlet 61 faces the exhaust gas as it comes toward it, so that the gas first encounters the short end 62 and then the long end 63. Thus a portion or sidestream of the exhaust gas is obtained or scooped from the main stream by the inlet 61 and passes into an interior passage 64. The scoop 41 also has an outer end portion 65 of larger diameter with a larger-diameter interior portion 66 and a larger-diameter exterior cylindrical wall 67. The two scoop portions 60 and 65 are connected together by a tapered portion 68 which is tapered at an included angle of preferably about 3°, though the angle is exaggerated in the drawings.

As indicated in FIGS. 3 and 4, the installation of this scoop 41 begins with the drilling of an opening 42 of approximately the same diameter as the exterior wall of the narrower portion 60 of the scoop 41. This opening 42 is drilled into the housing for the exhaust conduit, preferably near to or into the exhaust manifold 35. The hole 42 that is drilled in cylindrical. Then, with the inlet 61 of the scoop 41 properly aligned, as can be easily done at this stage, the scoop 41 is driven, as by a mallet or hammer, into the opening 42 until the fit is tight. This installation requires no particular skill. The tapered portion 68 imparts its tapered shape to the opening 42, so that the scoop 41 tightly fits the opening 42. Actually, it fits very tightly, the opening 42 having been reformed and slightly enlarged at its outer end by the driving of the tapered portion 68 of the scoop 41 into it.

The scoop 41 is preferably located as close as possible to the exhaust valve, directly in the flow path of the exhaust from one cylinder of the exhaust manifold 35 so as to assure pickup of total pressure of the exhaust gas. Such a system takes advantage of surges in pressure resulting from the exhaust cycle of its associated cylinder, picking up the total pressure, i.e., the static head plus the velocity head pressure. The system is, however, operative no matter where the scoop is located in the exhaust manifold, so long as the scoop 41 faces into the exhaust flow so that it picks up the total pressure of the exhaust system.

The cooling conduit system (FIGS. 1, 2, and 4)

The metal tubing 43, preferably aluminum, is secured to the outer wall portion 67 of the scoop 41 by having a relatively close fit to it, though not so close that there is any difficulty in attaching it, and then by using a conventional cylindrical clamp 70 (FIG. 4) to tighten it leak-tight around the circumference of the wall 67.

As stated before, and as shown in FIG. 1, this metal conduit 43 leads from behind the radiator 44 forward of it to a portion 71 which crosses in front of the radiator 44. Depending on the conditions desired and the size of the radiator 44, this may be either a straight run, or a curved or S-turn type of run; in any event, it slopes downwardly, so that any condensate therein runs to the centrifuge 46. The path is long enough to ensure that the exhaust gases will be cooled down to about 100° F., at least when temperatures outside are fairly normal.

To the far end 72 of this metal tube 43 is secured a short rubber tube 45, which serves to insulate the cooled gas so that it will not be heated very much within the engine compartment. Since the temperatures are fairly low, a relatively inexpensive type of rubber tubing 45, such as neoprene or the like, may be used. The connection between the two tubes 43 and 45 is made just ahead of the point where the heat of the engine tends to raise the temperature of the tubing, and the tubing 45 continues until it is secured to the centrifuge 46.

Collection of condensed water and solid particles from the exhaust gas sidestream (FIGS. 5–7)

The rubber tube 45 leads to the centrifuging water trap member 46, preferably made of plastic, via an inlet portion 74. The inlet portion 74 leads tangentially into a cylindrical chamber 75 having a lower portion 76 and an upper portion 77. Thus, the exhaust gas sidestream in the tube 45, now cool but with its full pressure, enters the cylindrical lower chamber portion 76 from the tangential inlet 74. Similarly, a tangential outlet 78 leads out from just below an imperforate wall 200 of the upper portion 77 of the chamber 75. Except for being at a higher level, the outlet 78 is preferably substantially in line with the inlet 74.

An inner circumferential wall 79 of the lower chamber portion 76 is formed to provide a series of vertical, water collecting, capillary slots 80 which are narrow and are preferably V-shaped, and lead to sloping, radial slots 81 on the sloping floor 82 of the chamber 75. This conical floor 82 should slope at an angle of at least 45°. The slots 80 are narrow, about 0.035" at the widest. The slots 81 are also preferably V-shaped and about 0.035" at the widest and slope down to an axial water outlet 83. The slots 81 may be interrupted once or twice by one or two circular, vertical recesses or grooves 73. Each time there are fewer slots 81 below such a recess 73 than above it; for the reduced diameter reduces the number of slots that the conical floor 82 can accommodate. The lower end may have four slots 81 (as shown in FIG. 6) or may be as many as eight. Each circular groove 74 carries the water from one groove pattern to the next.

Above the wall 79 with its slots 80, the upper member 77 defining the upper part of the chamber 75 has a smooth-walled inner peripheral portion 84 narrower in diameter than the wall 79, ending at its lower end in an overhanging shelf 85 defining the lower end of the upper chamber portion 76 and preventing moisture from going out through the upper exit 78. The shelf 85 preferably includes an annular upwardly extending groove 85a.

The upper chamber portion 77 has an imperforate upper end wall 200 from which depends a cylindrical member 201 spaced from the wall 84 to provide passage to the outlet 78. An upper portion 202 of the cylindrical member is smooth-walled; a lower portion 203 faces the slots 80 and is provided with a circumferential series of vertical through slots 204, ending at a lower end 205 that is set at a 45° handle and which is spaced a short distance, preferably less than 0.035" above the slots 81 of the conical floor 75, so that capillary forces will bridge the gap.

The vertical slots 80 and 200 act as capillary traps to the moisture condensed due to the drop in temperature in the metal tube portion 71, and the capillary forces created by the small spaces, 0.035" or less, hold the moisture so that it flows in a stream down the walls and goes via the sloping slots 81 to the axial outlet 83. The outlet 83 is itself small, about 1/16" to 3/32" in diameter, so that it remains full, and with its attached tube 86 lets the water fall by gravity out of the centrifuge 75, without providing a passage that would conduct out gas and lower the pressure of the gas. The outlet 83 may, if desired, be connected by a conduit 86 to a water reservoir 55a (See FIG. 15, described later) to supply at least part of the water therefor, or the water may simply drop out to atmosphere from the capillary centrifuge 46, carrying the objectionable solids with it. Thus, the centrifuge 46 not only gets rid of the water, it cleanses the gas stream, e.g., from soot and chemical additives to the engine's fuel.

A conduit 87, like the conduit 45 but longer, is connected to the tangential outlet 78 and leads to the reactor 40, to an inlet fitting 88, to which it is attached.

The reactor 40 (FIGS. 8–10)

The reactor 40 was formerly an assembly of metal parts, some of which were preferably made from powdered metal, as by pressing followed by sintering. In the present invention, due to the significantly lower temperatures employed, the reactor 40 or its components may be molded in a few parts from rigid plastic which is much less expensive than sintered metal, and then assembled and secure as by welding or cement, or is simply snapped together.

The reactor 40 uses the pressure of the clean, dry, cool exhaust gas to pump and meter the right amounts of water, and air for each operating condition. Preferably it is made in two parts 91 and 92 that telescope together and then may be ultrasonically welded together or simply snapped together, being (in FIG. 8)

held by a bead 91a on the part 91 and a groove 92a on the part 92 as shown by the drawings. In FIG. 8A a snap-fit assembly is illustrated; there is an annular rib 92b on the part 92, and the part 91 has an exterior wall with a step 91b, to provide a snap lock.

The body part 91 divides the gas flow into two gas streams by a first bore 93 and a second bore 94. The first bore 93 leads to a projecting jet conduit member 95 integral with the part 91 and having a constant outer diameter 97, except for a beveled outlet nose 96. Inside the nose 96, there is the restricted bore 93 to provide at its end the orifice portion of a main ejector 98, near the outlet 99 of the reactor 40. The jet conduit 95, fits, as by telescoping, into a constant diameter bore 99 in the body part 92, forming the ejector 98 when the exterior wall 97 of the part 91 is nested inside the bore 100, for the bore 99 is much wider than the bore 93.

The second bore 94 has a jet orifice 101. the orifice 101 leads into an enlarged passage 102 which enters an area 103 that is open to the atmosphere and thereby provides a second ejector 104. A water inlet fitting 105 on the body part 92 is connected to the water conduit 57 and has an orifice 106 that leads into the passage 102. There the sidestream of gas from the orifice 101 picks it up and carries it into the open area 103, where it encounters atmospheric air. It is important for the orifice 106 to be tangent to the orifice 101. The mixture of water and air then goes past an air inlet bore 107 to the bore 99. The air inlet bore 107 leads in at an angle approximately the same as that of the beveled nose 96 and ends at the nose, outlet 98, where both exhaust gas sidestreams merge into the larger diameter bore 99.

The mixture of exhaust gas, air, and water then goes via the outlet conduit 99 and from there via the rubber hose 87 to the vortex member 50.

Preferably, the ejector passage 93 is about 0.067" in diameter, and the diameter of the second ejector orifice 94 is about 0.0538", expanding at the passage 102 to about 0.070".

The exhaust gas at total pressure is thus conducted through the conduits 43 and 45, the centrifuge 46, and the conduit 87 and into the reactor 40 to the ejector passage 93 and 94. Since the first opening 93 has a larger diameter than the second ejector orifices 94, most of the flow will be through the first ejector 93, with a smaller amount going through the second ejector orifice 94, which expands at 101 to about 0.070", creating low pressure. Water or other suitable liquid is drawn in through the passages 106 and 102 as a result of the passage of the exhaust gas through the second ejector 101, taking in the water, or other suitable liquid, mixing it with some of the exhaust gas, and then sending it across the air-intake space 103.

Meanwhile, the passage of hot exhaust gas through the first ejector 98 draws in air from the air-intake space 103, thereby at the same time drawing in the moisture droplets from the ejector 102. The output of the two ejectors 98 and 102 forms a reacting mixture which then flows into the bore 99 and then by the tube 48 to the control or vortex device 50.

Figure 13:
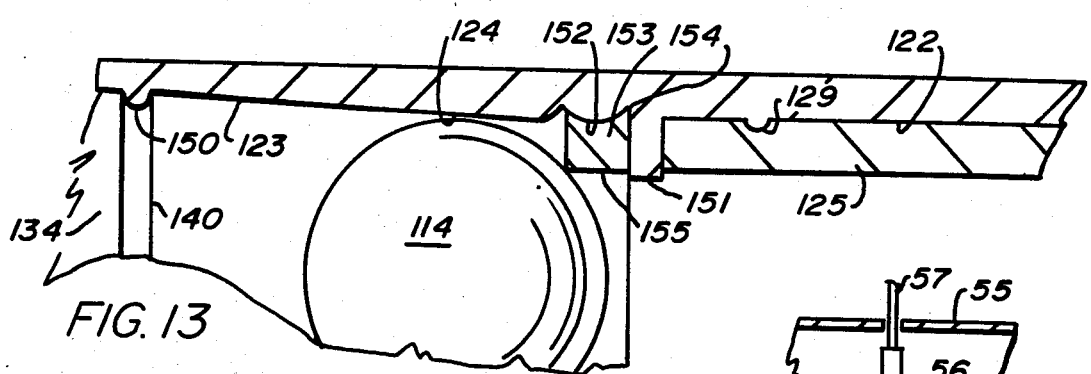
FIG. 13 is an enlarged fragmentary view of a portion of FIG. 12.
Figure 14:
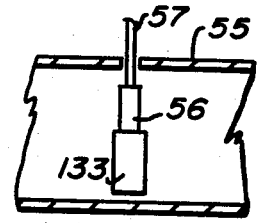
FIG. 14 is a simplified diagrammatic version of a portion of FIG. 1, showing the control valve mounted vertically in a water reservoir.

The liquid supply system (FIGS. 1, 12 and 13)

The valve 56 works with the reactor 40 and the control device 50 to meter precisely the correct amount of water. While the engine idles, no water is provided, at full throttle large quantities of microscopically small water droplets flow into the system.

The valve 56 has a body 110 with two coaxial cylindrical tubes 111 and 112. The interior tube 111, in conjunction with a magnet 113 and a ball 114, performs both as a check valve and as a fluid flow rate control. The outer tube or sleeve 112 provides three significant features: (1) It improves the moldability of the body 110; (2) it acts as a thermal insulator for the functional inner cylinder 111 during operation and moderates short-term temperature fluctuations that might cause inopportune sticking of the ball 114; (3) it helps to enable the valve 56 to be mounted in a variety of locations, either suspended in the reservoir 55 where the body 110 is not subjected to physical distortions or attached to some rigid structure outside the reservoir 55. The valve 56 is properly supported by securing its outlet hose 57 to appropriate structure and letting it hang down inside the water in the reservoir 55.

The tubes 111 and 112 are joined together by a radial portion 117 at the outlet end only. Otherwise, they are spaced apart radially by an annular space 118. An open end 120 of the inner tube 111 lies a little beyond an open end 121 of the outer tube 112. The inner tube 111 has a cylindrical inlet bore 122, a larger-diameter cylindrical outlet bore 123, and a frustoconical or tapered portion 124, acting as one seat for the ball 114.

The magnet 113 is in a holder 125 having four retaining fins 126, which, preferably, are slightly warped to enhance installation. The holder 125 may have threads 127 that go into the bore 122 and form matching threads 128 there. The bore 122 is provided with an inwardly extending sealing rib 129 that engages the outer wall of the holder 125. The holder 125 has a radially outwardly extending flange 130 with a radial wall 131 that abuts the open end 120 of the inner tube 111, and there is clearance between the wall 131 and the open end 121 of the outer tube 112 to prevent distortion of the inner tube 111.

The holder is held in a closed-end cylindrical filter-inlet member 133 which may comprise a polyurethane ether base member having many small through passages therethrough. This member 133 filters out solids and lets only liquid pass into the valve 56. The closed end of the filter-inlet member 133 is held away from the end surface of the holder 125 by three or so spacer bumps 125a. The cylindrical portion of the member 133 has a diameter somewhat smaller than the walls 112 and grasps them firmly. Side filter flow comes between the end of the member 130 and the closed end of the filter 133.

The valve 56 has a seat member 134 with a cylindrical portion 135 having external threads 136 engaging threads 137 of the body 110 and has sealing ribs 138. The cylindrical portion 135 ends in a planar annular end wall 140 into which are recessed radial passages 141 and from which a smooth bore 142 leads axially through the member 134, extending beyond the cylindrical portion 135 and into a smooth cylindrical or tubular portion 143.

A cylindrical flange 144 has an axial finger 145, and the body 56 has a knurled portion 146 on the exterior wall of the outer tube 115. A recessed portion 147 of the finger 145 has a rib 148 to engage the knurls 146 to enable audible indication of the extent of adjustment.

As seen better in FIG. 13, the ball 114 seats, at one end of its travel, against the frustoconical passage portion 124 and can move against the end wall 140. An annular rib 150 limits the inward movement of the seat 134 and therefore of the end wall or seat 140. The distance from the magnet 113 to the seated ball 114 may be adjusted by adjusting the portion of the magnet holder 125, and the distance between the ball's two seats 124 and 140 may also be adjusted by use of the finger 145 and knurled portion 146. The inward movement of the magnet holder 140 is limited by an annular rib 151 in the passage 122. Just beyond the rib 151 the inner bore of the member 111 is provided with an annular rib 152 having an arcuate inner surface. An O-ring 153, preferably of silicone elastomer, has a concave arcuate outer surface 154 and a cylindrical inner surface 155 that is substantially the same inner diameter of the rib 151.

During operation, water flows from the reservoir 55, or other fluid source through the rubber tubing 116 to the filter-inlet member 133 and into the magnet holder 125. Water flows around the magnet 113. The relative position of the ball 114 and the molded seat 124 control fluid flow. The distance that the ball 114 is allowed to travel regulates flow, when flow occurs. The water flows out through the outflow stem 143.

Figure 15:
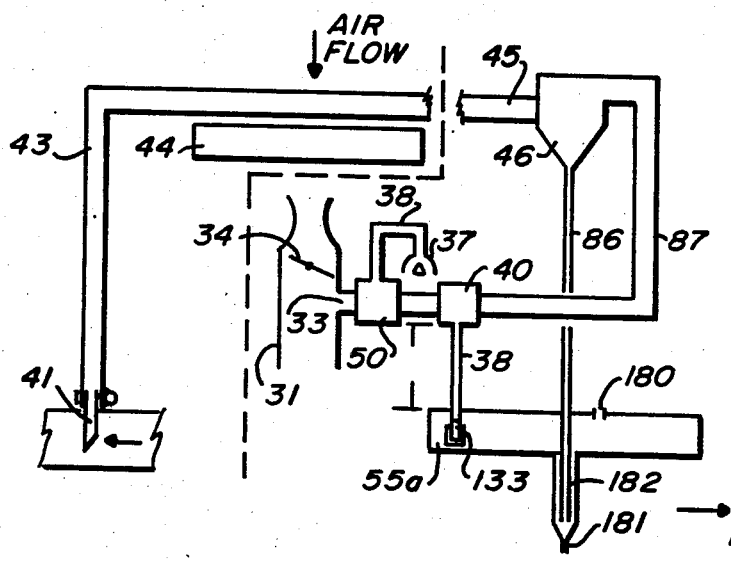
FIG. 15 is a diagrammatic version of a modified form of system embodying the principles of the present invention and employing a system in which water is condensed from a portion of exhaust gas.

A system in which the water is obtained from the water trap 46 (FIG. 15)

FIG. 15 shows diagrammatically a system very similar to the system already discussed except that there is a water reservoir 55a which is directly connected to the outlet 86 of the centrifuge 46.

In this instance the tube 86 leads to a micro-reservoir 55a which is provided at its upper end with an overflow vent 180, and at its lower end a small constricted drain 181 to remove continuously small, unburnable particles from the exhaust sidestream. It will be noted that the tube 86 leads deep into this reservoir 55a, preferably into a lower depending portion or well 182 from which the drain opening 181 leaves. This is to make sure that the main portion of the reservoir will never be able to have these particles float up and get into that portion. In this instance, the valve 56 is not needed. The filter 133 can be used as a safety member, but since the water is a distillate and the unburnable solid particles have been removed at the drain 181, the filter 133 is not required, and the tube 38 may end slightly above the bottom of the reservoir 55a. The micro-reservoir 55a is connected directly by the tube 38 to the reactor 40. Although these parts and some others are shown very diagrammatically and in a simplified form, it is to be understood that they have substantially the structure already described except for the new portion, which may be somewhat out of scale, but which does reflect the general idea.

Thus, the water condensed from the cool exhaust gases at the capillary centrifuge 46 goes down into the very bottom of the well 182 of the reservoir 55a, and then rises gradually. The overflow vent enables the reservoir 55a to get rid of excessive water, which will usually be obtained, while the drain 181 keeps the water in the reservoir proper free from such particles.

The reservoir 55a can have a fill cap to enable addition of further water that may be required. the restricted flow rate of the single sidestream needs its full pressure to operate the reactor 40 and may not provide adequate water by itself. However, the system of FIG. 15 can reduce the size of the reservoir. required.

It will also be noted that the reservoir 55a is located so that it is a height H below the inlet to the reactor 40. This position may be adjusted so that the water flow to the reactor 40 is off during engine idle conditions. Once properly adjusted, it need not be readjusted unless idle conditions are readjusted.

Figure 16:
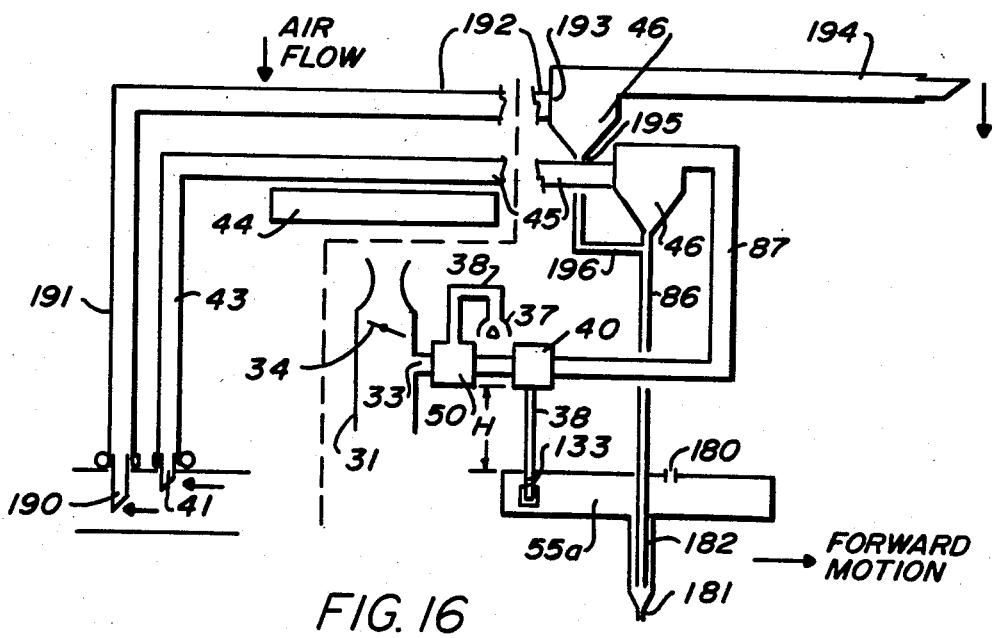
FIG. 16 is a similar diagram of another modified form of the invention, providing water condensation.

Obtaining water for the reactor from a combination of two systems (FIG. 16)

Depending on the size of the engine and the amount of water that is consumed during combustion, it is possible that for some engines and vehicles the amount of exhaust gas taken off of the scoop 41 and employed in the reactor 40 after passing through the centrifuge 46, would not be sufficient to supply all the needs of the combustion system. However, this may be done by the system shown in FIG. 16, which is much like that shown in Fig. 15, except that additional water is supplied. In this instance there is another scoop 190 like the scoop 41, although it may be larger in cross section, and connected to a tube 191, which like the tube 43 may lead forward of the radiator to cool the gases, and then is connected by another tube 192, preferably of rubber, to a second centrifuge 193, which is substantially identical to the first centrifuge. The gas therefrom goes by an outlet tube 194 either to the rear of the car or to some low pressure exhaust system point. FIG. 16 shows an arrow at the outlet 194 indicating engine exhaust or air flow back below the vehicle, to create suction that acts on the gas in the outlet tube 194 to increase its exhaust flow. The water condenses in the centrifuge 193 exactly as in the centrifuge 46, and there is an outlet 195 like the outlet from the centrifuge 46, which leads by a tube 196 into the tube 86, as by a juncture. Otherwise, this system is the same as already described in connection with FIG. 15.

The control device 50 (FIGS. 17–20)

The control device or vortex device 50, generates a tornado-like swirl of fluids, channeling the premeasured amounts of water, air, and exhaust gases to the carburetor 32. The built-in turbulence shears, and thereby vaporizes, the water and the fuel. A tornado-like turbulence then carries the fuel-air-water mixture to the proper use point without coating the walls of the intake manifold with fuel.

As shown in FIGS. 17–20, the control device 50 may be an assembly of two molded plastic members 160 (FIGS. 17–19) and 161 (FIGS. 18 and 20). The member 160 includes an axial inlet 162 connected by the tube 48 to the reactor 40 and also a tangential inlet 53 connected by the tube 52 to the PCV valve 37. The member 161 includes an axial outlet 163 connected by a short conduit 164 (FIG. 2) to the PCV gas inlet 33.

The member 160 has an orifice 166 from which a passage 167 spreading at 14° included angle leads into a vortex chamber 168 formed by the two members 160 and 161 when they are assembled together and into which the tangential inlet 53 also leads by a narrowing passageway 169 (FIG. 19). The passage 167 preferably extends well into the chamber 168 beyond the end wall 170 at a projecting portion 171. This passage 167 has this structure and the 14° included angle in order to expand the fluids passing through the orifice 166, to increase the shearing action as these fluids are drawn into the vortex tornado, rotating past the projecting portion 171, accelerating in rotation at the minimum orifice 163 to a linear velocity at or near the velocity of sound. Similarly, the axial outlet 163 of the member 161 has a 14° included angle.

The first molded plastic member 160 has a circular annular rim 172 (FIG. 19) surrounded by a stepped portion 173 into which the member 161 fits, as shown in FIG. 18. To aid in creating the vortex action, the passage 17 opens beyond the end the tangential inlet passageway 53. The tangential passageway 53 (See FIG. 19) includes a substantially straight portion 174 of the rim 172 in line with the tangentially side of the passageway, and opposite it the rim 172 converges toward it with a short angled portion 175 ending in a shorter parallel portion. The exterior of the member 160 is shaped to provide good anchorages for the conduits 48 and 53 and also to provide a generally efficient shape.

The second molded plastic member 161 has a circular annular end wall 176 with a cusp-like curved interior wall 177 leading to the central outlet 163. When the members 160 and 161 are assembled, the walls 171, 172 and 177 define the vortex chamber 168. The first and second plastic members 160 and 161 fit together snugly and are, preferably, ultrasonically welded together with the annular end wall 180 facing the wall 176 and nesting snugly in and welded to the stepped portion 173.

The control device 50 generates a tornado-like stream shown in FIG. 2 that shears the fluids and provides low pressure in its center, which together vaporize fuel, PCV products, and water at all conditions except full throttle, when the water is in microscopic liquid droplets. The tornado-like stream pulls fuel into it and vaporizes the fuel. This charge is then caried via the intake manifold 31 to each cylinder 39 when its intake valve 39a is open. This action provides a desired gas swirl in the cylinder. In the northern hemisphere, the stream rotates counterclockwise, as viewed along the axis in the direction of flow; in the southern hemisphere, the direction is clockwise, as shown in FIGS. 2 and 2A. The structure may be changed to achieve these differences.

The water is in the form of water vapor except at full throttle, when the water vapor is eliminated in form of the microscopic droplets, thereby eliminating the partial pressure of the water vapor and enabling more intake of oxygen into the fuel-air-mixture.

Thus, the mixture of exhaust gas, air, and water passes from the reactor 40 into the vortex chamber 168 via the axial inlet 162, while the PCV gases are being drawn in through the tangential inlet 53 and are whirled around in a way to achieve maximum shear tubulence as a result of their tangential entry into and the shape of the vortex chamber 168. This action produces a "tornado" that sheers the fluids and, in conjunction with the low pressure at the center, vaporizes the water and PCV liquid droplets. The resulting mixture is then developed in a tornado-like whirling stream applied via the flaring outlet 163 to the intake manifold 31. FIG. 2 shows the whirling flow as it goes from the vortex member 50 into the carburetor 32 and thence into the intake manifold 31. There, as shown in FIGS. 2 and 2A, it enters any intake valve 39a which is open and enters it with this whirling motion that aids in the combustion process.

The device 50 thus draws in the liquid fuel droplets and shears them while carrying them into the low pressure area of the "tornado" center. Both factors work together to create a low-temperature vapor of fuel and water carried in the "tornado" to the cylinder 39 having its intake valve 39a open. When one valve 39a closes, another one is opened, and the "tornado" carries its vapor charge and its turbulence successively to each combustion chamber 19.

While the PCV valve 37 may be used, it is preferably to remove the active parts of that valve or to substitute for the valve 37 a member which exteriorly is shaped exactly like the PCV valve 37 and interiorly comprises a smooth cylindrical bore (See U.S. Pat. No. 4,417,548, FIG. 7). This member may be an inexpensive plastic molded part made, for example, from polypropylene.

A modified connection of the reactor 40 to the vortex device or control device 50 (FIG. 21)

There need not be a connection like that shown in FIGS. 1 and 2 in which the reactor 40 is spaced from the control device 50. In its stead as shown in FIG. 21, the outlet from the reactor 40 may be connected directly to the inlet of the control device 50. Preferably this is done by providing an extension portion 185 with an interior frustoconical bore 186 leading from a shoulder 187 and having a blunt end 188. The control device 50 then has an exterior wall 196 that encircles and mates with the bore 186 and has a shoulder 197 that abuts against the blunt end 188 and a blunt end wall 198 that abuts against the shoulder 187. The assembly may then be ultrasonically or otherwise welded together.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A combustion control method for an automotive engine in a vehicle having a large, open intake manifold leading to a plurality of cylinders with intake valves and exhaust valves leading to an exhaust conduit, comprising keeping the intake manifold wide open with no ducts and no barriers, so that all of the cylinders are joined in said large, open intake manifold, supplying fuel to said intake manifold, withdrawing a sidestream of gas from said exhaust gas, cooling said sidestream to below water condensation temperature, removing the condensed water from said cooled sidestream, creating a whirling, tornado-like stream of gas, providing said stream with the cooled, moisture-free exhaust gas, and also with a desired quantity of liquid, said tornado-like stream acting to shear said liquid and vaporize it, sending said stream with its exhaust gas and liquid vapor into said manifold with a low-pressure vortex center, thereby creating a vapor-laden whirling charge to each cylinder when its said intake valve is open.

2. A combustion control system for an automotive engine in a vehicle, said engine having an intake manifold, a gas inlet opening into said intake manifold, and an exhaust conduit, said vehicle having a cooling system with a radiator at the front of the vehicle, including in combination:

a sidestream exhaust gas tube having a scoop inlet in said exhaust-gas conduit, a first metallic tube portion leading from said scoop forward of said radiator to receive ambient air directly on its exterior surface so as to cool said exhaust gas to near ambient-temperature, a water trap to remove condensed water from said sidestream exhaust gas, along with entrained particles, and a final insulating tube portion extending rearward of the radiator and limiting reheating of the cooled exhaust gas, a reactor device having an exhaust gas inlet connected to said insulating portion of sidestream exhaust gas tube to receive cooled exhaust gas therefrom, first ejector means for drawing in aqueous liquid from a source of such liquid, second ejector means for drawing in atmospheric air and mixing it with the gas-liquid mixture from said first ejector means, and an outlet, and a vortex device having a vortex chamber with a tangential inlet connected to a gas supply at substantially atmospheric pressure, an axial inlet connected to the outlet from said reactor device, and an axial outlet connected directly to said gas inlet opening.

3. A combustion control method for an automotive engine in a vehicle, said engine having an intake manifold, a gas inlet opening into said intake manifold, a series of combustion chambers connected to said intake manifold, and an exhaust conduit, said vehicle having a cooling system, including in combination:

scooping from said exhaust conduit an exhaust sidestream, cooling said exhaust sidestream while condensing the water therein, removing the condensed water from said sidestream along with entrained particles, drawing into said sidestream aqueous liquid and atmospheric air and mixing them all together, whirling the resultant mixture to provide a tornado-like stream, and sending said tornado-like stream via said gas inlet opening into said intake manifold, entraining fuel therein and passing into any open combustion chamber.

4. The method of claim 3 wherein said intake manifold is wide open without barriers having a single large chamber connected to all of said combustion chambers.

5. A combustion control system for an automotive engine in a vehicle, said engine having an intake manifold, a gas inlet opening into said intake manifold, and an exhaust conduit, said vehicle having a cooling radiator near the front of said vehicle, said system including in combination:

a first sidestream exhaust gas tube having a first scoop inlet in said exhaust-gas conduit, a first metallic tube portion leading from said first scoop forward of said radiator and cooled then by ambient air, so as to cool said exhaust gas to near ambient-temperature, a first water trap to remove condensed water from said sidestream exhaust gas, along with entrained particles, and an insulating tube portion extending rearwardly of the radiator to conduct the cooled, dry exhaust gas at the pressure in said exhaust gas conduit, while limiting reheating thereof, a second sidestream exhaust gas tube located at a high-pressure zone in the exhaust conduit, having a second scoop inlet in said exhaust gas conduit, a second water trap for condensing water from exhaust gases connected to said scoop by a heat-radiating tube and having an exhaust gas outlet and a water outlet, a water reservoir supplied by water from said water outlet and having its own outlet, a reactor device having a an exhaust gas inlet connected to said insulating portion of sidestream exhaust gas tube to receive cooled gas therefrom at substantially the pressure in the exhaust gas conduit, first ejector means for drawing in water from said reservoir, second ejector means for drawing in atmospheric air and mixing it with the gas-water mixture from said first ejector means, and an outlet, and a vortex device having a vortex chamber with a tangential inlet connected to a gas supply at substantially atmospheric pressure, an axial inlet connected directly to the outlet from said reactor device and an axial outlet connected directly to said gas inlet opening.

6. The system of claim 5 wherein the exhaust gas outlet of said second sidestream exhaust gas tube is cut off at an angle to provide suction.

7. A combustion control system for an automotive engine in a vehicle, said engine having an intake manifold, a gas inlet opening into said intake manifold, and an exhaust conduit, said vehicle having a cooling system including in combination:

a sidestream exhaust gas tube having a scoop inlet in said exhaust-gas conduit, heat transfer means for cooling the scooped sidestream of exhaust gas to below water condensation temperature, a water trap to remove condensed water from said sidestream exhaust gas, along with any entrained particles, a reactor device having an exhaust gas inlet connected to said water trap to receive cooled, dry exhaust gas therefrom, first ejector means for drawing in liquid from a source of such liquid, second ejector means for drawing in atmospheric air and mixing it with the gas-liquid mixture from said first ejector means, and an outlet, and a vortex device having a vortex chamber with a tangential inlet connected to a gas supply at substantially atmospheric pressure, an axial inlet connected to the outlet from said reactor device, and an axial outlet connected directly to said gas inlet opening.

8. The system of claim 7 wherein the axial inlet of said vortex member has an initial narrowing portion providing a restricted orifice followed by a generally conical widening portion at about 14° to cylindrical and leading beyond an end portion of said vortex chamber and well into said vortex chamber.

9. The system of claim 7 wherein said reactor comprises a body defining a generally axial main passage with a constricted passageway portion leading into a widened passage of constant diameter and including said outlet, a secondary lower pssageway having a constricted inlet smaller in diameter than that of said main passageway and also followed by a first orifice slightly larger in diameter than that of said constricted passageway portion of said main passageway, a second orifice with its axis perpendicular to that of said orifice, said second orifice being tangent to said second orifice connected to a conduit from said source of liquid and opening into a portion of said lower passageway wider than said second orifice, said second passageway thereby serving as said first ejector means, this in turn being followed by a portion open to atmosphere and an angular passage leading therefrom into said widened passage of said main passageway, which constitutes said second ejector means.

10. The system of claim 9 wherein said body comprises two plastic molded members of generally cylindrical exterior shape permanently joined together.

11. The system of claim 7 wherein said axial inlet of said vortex is directly connected to said reactor outlet, said vortex and reactor having bodies that are directly coupled together.

12. The system of claim 11 wherein said vortex's axial inlet includes a body portion providing a frustoconical inner periphery and said reactor's outlet includes a body portion providing a frustoconical outer periphery that fits snugly into said frustoconical inner periphery of said vortex.

13. The system of claim 12 wherein said frustoconical portions of said vortex and reactor are permanently fused together.

14. The system of claim 7 having a flow control valve between said source of aqueous liquid and said first ejector means, said valve incorporating a ferromagnetic ball and a ball seat in a non-ferromagnetic tube having a tapered wall providing a flow-rate control valve means near said seat, a magnet in said tube attracting said ball toward said seat, while normal flow of said liquid forces the ball away from said seat, said tube having an annular interior rib spaced a short distance away from said magnet, and having an arcuate shape, said ball seat being a resilient ring having an exterior shape corresponding to that of said rib and mounted thereon and extending radially inwardly therefrom and limiting movement of said ball toward said magnet.

15. The system of claim 14 wherein said ring is a silicone elastomer sealing O-ring.

16. The system of claim 14 wherein said valve is mounted vertically in said reservoir with its inlet at the bottom and its outlet at the top, and located at the side of said reservoir farthest from the front of the vehicle.

17. The system of claim 16 wherein the inlet of said flow control valve is covered by a cylindrical filtering member of sponge-like material with tiny passages extending through it.

18. The system of claim 7 wherein said sidestream exhaust gas tube includes, as said heat transfer means, a metallic tube portion leading from said scoop to a cool area to receive cool air directly on its exterior surface.

19. The system of claim 18 wherein said sidestream exhaust gas tube includes a second, insulating tube portion connected to said metallic tube portion and leading rearwardly of said vehicle to said water trap.

20. The system of claim 18 wherein said vehicle cooling system includes a radiator at the front of said vehicle and said cool area is forward of said radiator so that it is cooled by ambient air.

21. The system of claim 20 wherein said sidestream exhaust gas tube includes a second, insulating tube portion connected to said metallic tube portion and leading rearwardly of the vehicle and to the rear of said radiator to said water trap, for limiting reheating of the cooled exhaust gas.

22. The system of claim 7 wherein the liquid drawn in by said first ejector means is aqueous.

23. The system of claim 22 wherein said water trap comprises a centrifuging chamber that is circular in horizontal cross section with a lower cylindrical chamber having a tangential inlet and an upper, smaller-diameter chamber having a tangential outlet, a closed upper end wall, and a cylindrical side wall, said chambers being joined by a shelf forming the upper end of the lower chamber, said lower chamber having a restricted drain outlet at its lower end.

24. The system of claim 23 wherein said water trap has a cylindrical shell depending from said upper end wall and spaced radially inwardly from said cylindrical side wall of said upper chamber and extending down into said lower chamber, terminating above the lower end of said lower chamber.

25. The system of claim 23 wherein said water trap comprises two molded plastic members, one comprising said lower chamber except for said shelf and the other comprising said shelf and said upper chamber, permanently secured together.

26. The system of claim 23 wherein the lower chamber is provided with a cylindrical wall that is serrated to provide a large number of capillary vertical indentations and has a floor sloping down at an angle of at least 45° toward said drain outlet at its center, said floor having capillary indentations leading radially from the bottom of said cylindrical wall to said drain opening.

27. The system of claim 26 having a cylindrical shell depending from said upper end wall and spaced radially inwardly from said cylindrical side wall of said upper chamber and terminating above said floor, being spaced away therefrom, said shell having an upper imperforate portion and a lower portion having a series of narrow slots therethrough.

28. The system of claim 23 wherein said water trap has narrow tubing connected to and leading down from said drain opening.

29. The system of claim 28 having a reservoir below said drain opening and having an upper end, a main reservoir portion, and a well at its lower end below said main portion, with an inlet tube connected to the lower end of said tubing and leading down into said well, a constricted drain opening at the bottom of said well, an overflow opening at the upper end of said reservoir, and a water conduit from said main reservoir portion connected to said reactor device, as its said source of liquid.

30. The system of claim 29 having a second source of water, comprising a second sidestream exhaust gas tube having its own scoop inlet, its own metallic tube portion leading forward of said radiator, its own insulated tube, and its own water trap having a drain outlet leading into said tubing for the outlet of the first-mentioned said water trap and from there to said reservoir.

* * * * *